United States Patent [19]

Dickinson et al.

[11] Patent Number: 5,631,704
[45] Date of Patent: *May 20, 1997

[54] ACTIVE PIXEL SENSOR AND IMAGING SYSTEM HAVING DIFFERENTIAL MODE

[75] Inventors: Alexander G. Dickinson, Neptune; El-Sayed I. Eid, Freehold; David A. Inglis, Long Branch, all of N.J.

[73] Assignee: Lucent Technologies, Inc., Murray Hill, N.J.

[*] Notice: The term of this patent shall not extend beyond the expiration date of Pat. No. 4,966,963.

[21] Appl. No.: 323,203

[22] Filed: Oct. 14, 1994

[51] Int. Cl.⁶ .................................................. H04N 5/335
[52] U.S. Cl. .......................... 348/308; 348/294; 257/291; 257/292; 250/208.1
[58] Field of Search ...................................... 348/230, 294, 348/297, 298, 311, 312, 316, 317, 319, 320, 321, 322, 323, 154, 155, 300, 301, 307, 308, 309; 257/291, 292; H04N 5/335

[56] References Cited

U.S. PATENT DOCUMENTS

| | | |
|---|---|---|
| 5,153,420 | 10/1992 | Hack et al. ........................... 250/208.1 |
| 5,355,165 | 10/1994 | Kosonocky et al. ..................... 348/311 |
| 5,471,515 | 11/1995 | Fossum et al. ........................... 377/60 |

Primary Examiner—Wendy Garber
Assistant Examiner—Ngoc-Yen Vu

[57] ABSTRACT

An active pixel imaging system and method to generate an differential output signal consisting of the differences in a viewed image between adjacent detected flames. A buffered electrical charge storage capacity of the active pixel sensor is utilized to provide a system with reduced complexity and hardware requirements. In the imaging system, when a particular active pixel sensor is activated it generates a voltage signal corresponding to a previous frame's detect light intensity before the pixel is reset to generate a voltage signal corresponding to a present frame's detected light intensity. A differential output circuit is used to generate a differential output signal based on these two generated voltage signals.

35 Claims, 4 Drawing Sheets

ACTIVE PIXEL SENSOR AND IMAGING SYSTEM HAVING DIFFERENTIAL MODE

FIELD OF THE INVENTION

This invention relates generally to improvements in electronic image sensors, and more specifically to active pixel image sensors and imaging systems capable of generating differential output signals.

BACKGROUND OF THE INVENTION

Conventional electronic video cameras utilize charge-coupled device ("CCD") imagers to convert optical images into corresponding electronic signals. A typical CCD imager includes a matrix of photosites that are capable of collecting free electrons that form an electrical charge packet that is directly proportional to the photon radiation incident at that photosite. Accordingly, when an image is focused on the surface of the array, the charge packet at each photosite of the array corresponds to a respective picture element or pixel of the complete image. The generated photosite charge packets are transferred in a parallel manner into a CCD shift register, where they are transferred serially as an output signal of the CCD imager. The CCD imager output signal is a series of electronic signals whose amplitudes represent the light intensity of the image at each pixel for a single image frame. The process is continuously repeated to generate output signals which correspond to several image frames per second. As a consequence, each frame in the generated output signal contains information concerning the detected light intensity at each photosite.

A drawback of typical CCD imagers is that they require near-perfect charge transfer over distances on the order of centimeters through semiconductor materials. As a consequence, such CCD imagers require a substantial amount of power and are difficult to use under low light conditions, difficult to manufacture in large array sizes, and difficult to integrate with on-chip electronics. Active pixel sensors have become increasingly popular as an alternative to CCD imagers in video equipment. Active pixel sensors employ one or more on-chip transistors at each pixel photosite in the array. The transistors buffer a photo-signal corresponding to the charge packet generated by the photosite and drive an output signal line avoiding the disadvantages of the CCD imager. However, typical active pixel sensor arrays still generate an output signal with each frame containing information concerning the detected light intensity at each photosite.

In certain applications, such as motion detection for use in, for example, security cameras, and data compression for high-definition television ("HDTV"), it is desirable to generate a video signal that corresponds to only the difference between two adjacent frames rather than the actual detected light intensity at the pixels for each of the frames themselves. Accordingly, if there is no motion or change in a scene viewed by such system, then the system generates no output signal. If, however, an inter-frame change appears due to motion or a change in the scene, then the imaging system generates a corresponding differential output signal. A conventional CCD imager and known active pixel sensor arrays require additional equipment to generate a differential output signal. Such equipment, which may include an analog-to-digital converter, a frame buffer memory and a system controller, increases the complexity, cost, power consumption and size of the system.

As is apparent from the above, a need exists for a low power, compact imaging system having a differential output signal.

SUMMARY OF THE INVENTION

In one embodiment, an imaging system having a differential output signal according to the present invention employs an array of active pixel sensors arranged into sensor rows and columns. Each sensor collects electrical charge at a photogate corresponding to detected light intensity by the sensor over a frame interval. The generated electrical charge may then be transferred to a buffered diffusion node within the sensor. The voltage at the diffusion node is buffered from other voltage signals generated external to the sensor. In accordance with one aspect of the invention, each active pixel sensor maintains a diffusion node voltage corresponding to a previously detected frame while collecting electrical charge in the photogate corresponding to a present frame.

A row decoder may be connected to the sensor arrays to simultaneously activate the sensors in a respective row to detect light as well as generate an output voltage signal corresponding to the diffusion node voltage. The sensor outputs for a respective column of sensors are connected to a corresponding one of a plurality of differential output circuits. The output circuits are also connected to a common output line. The differential output circuits are able to temporarily store first and second voltage signals received from the connected sensors which correspond to the diffusion node voltages for the previous and present frames. The output circuits further generate a difference signal corresponding to the temporarily stored voltages to the common output line.

A timing controller may be connected to the row decoder and each differential output circuit to control the system timing. The timing controller may cause each sensor row to be sequentially activated to light intensity over a predetermined integration period per frame. At substantially near the end of the integration period for a present frame, the row sensors are activated to generate an output voltage signal. When activated, each sensor provides to the differential output circuits a first voltage signal corresponding to the existing diffusion node voltage for the previous frame's detected light intensity. The sensors are then reset and generate a new diffusion node voltage corresponding to the present frame's detected light intensity. Second voltage signals corresponding to these new node voltages are then provided to the differential output circuits. The timing controller may control the differential output circuits to temporarily store the received first and second voltage signals to generate corresponding difference output signals. Also, the timing controller may cause the differential output circuits to sequentially provide the difference output signals to the common output line to form the differential output signal.

The present invention utilities the sensors buffered diffusion node to maintain the previous frame's detected light intensity during the detection of the present frame's light intensity. This technique provides the ability to generate a differential output signal without the need of a large memory device or analog-to-digital converters to maintain values for each of the sensors. As a consequence, the present invention has reduced power consumption and complexity. The present invention may be implemented in a system possessing compact dimensions which will enable it to perform functions previously not thought possible for prior art differential imaging systems, such as in hidden security cameras.

Additional features and advantages of the present invention, will become apparent by reference to the following detailed description and accompanying drawings.

DETAILED DESCRIPTION

Figure 1:
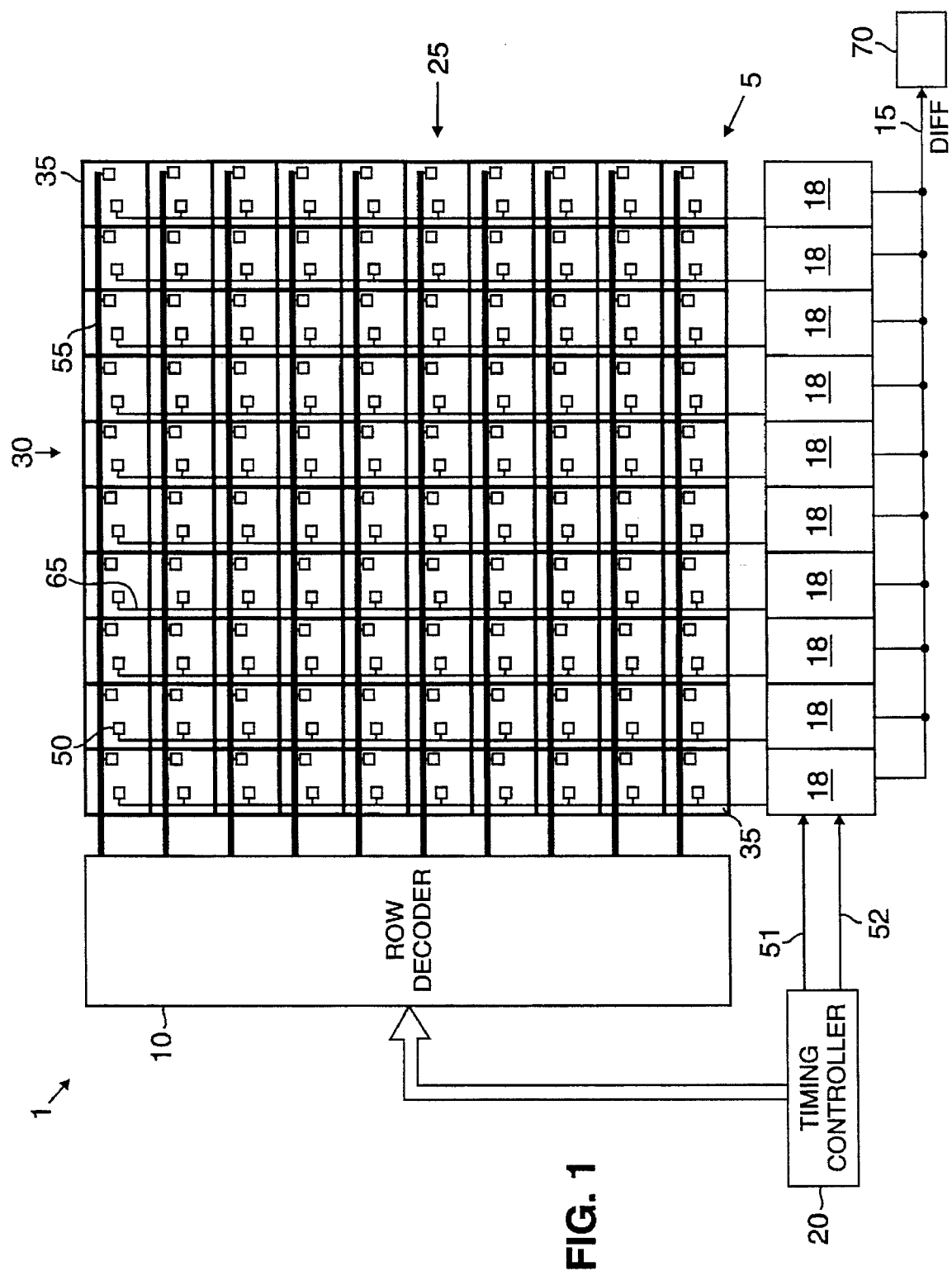
FIG. 1 is a schematic diagram of an exemplary active pixel sensor imaging system in accordance with the present invention.

FIG. 1 shows an active pixel sensor imaging system 1 according to the present invention having an array of active pixel sensors 5, a row decoder 10, a plurality of differential output circuits 18 and a timing controller 20. The active pixel sensor array 5 includes ten rows 25 and ten columns 30 of closely spaced active pixel sensors 35. The active pixel sensor array 5 is illustrated as a ten-by-ten sensor array for illustrative purposes only and is not meant to be a limitation on the present invention. An active pixel sensor array in accordance with the present invention may consist of any number of row and columns of active pixel sensors, and for many applications will typically consist of an array of a large number of pixels.

Figure 2:
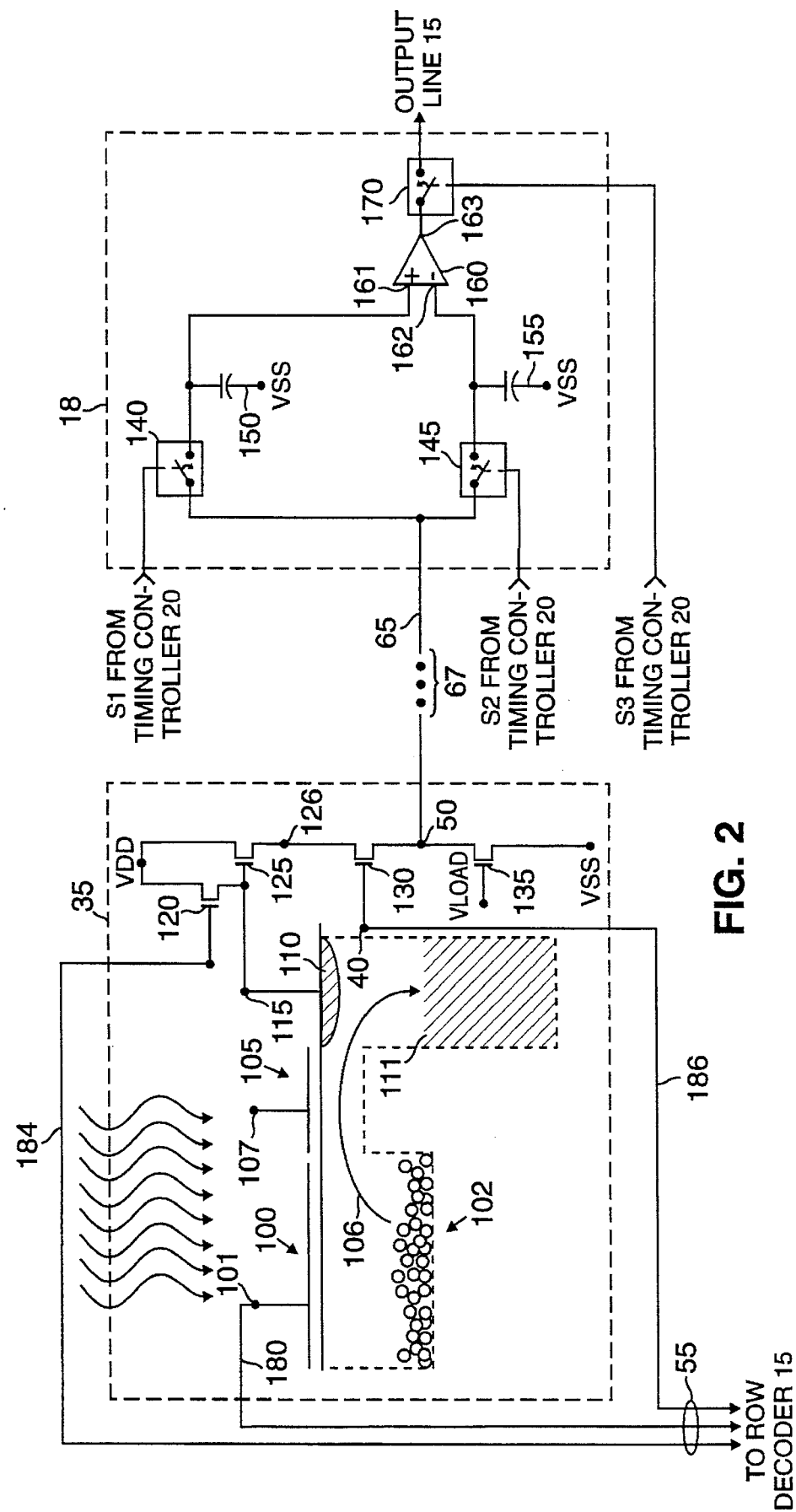
FIG. 2 is a schematic diagram of an exemplary active pixel sensor and output circuit which may be used in the system of FIG. 1.

Each active pixel sensor 35 is capable of converting a detected quantity of light to a corresponding electrical signal at an output 50. A plurality of control lines 55 extend from the row decoder 10 and connect to each of the pixel sensors 35 in a respective sensor row 25. The control lines 55 connected to each sensor 35 consist of a photogate control line 180, a reset control line 184 and a select control line 186, as shown in FIG. 2.

Each active pixel sensor output 50 in a corresponding sensor column 30 is connected by a column output line 65 to a particular differential output circuit 18. Each one of the plurality of differential output circuits 18 is further connected to a common imaging system output line 15. A differential output signal DIFF is generated by the differential output circuits 18 on the output line 15. The differential output signal DIFF may be provided by the output line 15 to other processing circuits 70 to perform, for example, motion detection or video data compression regarding a viewed image.

In operation, the timing controller 20 provides timing signals to the row decoder 10 which sequentially activates each row 25 of active pixel sensors 35 via the control lines 55 to detect light intensity and to generate corresponding output voltage signals during each frame interval. A frame, as used herein, refers to a single complete cycle of activating and sensing the output from each sensor 35 in the array 5 a single time over a predetermined frame time period. The timing of the imaging system is controlled to achieve a desired frame rate, such as 30 frames per second.

When detecting a particular frame, each sensor row 25 may be activated to detect light intensity over a substantial portion of the frame interval. In the time remaining after the sensor row 25 has detected the light intensity for the frame, each of the respective sensors simultaneously generates output voltage signals corresponding to the amount of light detected by that pixel sensor 35. If an image is focused on the sensor array 5 by, for example, a convention camera lens, then each pixel sensor 35 generates an output voltage signal corresponding to the light intensity for a portion of the image focused on that pixel sensor 35. The output voltage signals generated by the activated sensor row 25 are simultaneously provided to the corresponding differential output circuit 18 via the column output line 65.

The differential output circuits 18 generate difference output signals based on the corresponding received sensor output signals. The generated difference output signals are provided to the output line 15 in a serial fashion to form the differential output signal DIFF based on timing control signals from the timing controller 20. The differential output signal DIFF comprises information corresponding to the difference between adjacent frames of the detected image. If there is no motion or change in a scene viewed by the imaging system 1, then the system 1 generates no output signal. If, however, a change appears due to motion or a change in the viewed image between consecutive frame readouts, then the imaging system 1 generates a corresponding differential output signal.

During the operation of the imaging system 1, the timing controller 20 controls the row decoder 10 and plurality of differential output circuits 18 to continuously generate the differential output signal DIFF for consecutive frames at the predetermined frame rate. Suitable timing control circuits 20 include microprocessor controllers, finite state machine implementations, such as application specific integrated circuits, combinational logic circuits or any other circuit capable of generating the necessary timing signals to the row decoder 10 and the differential output circuits 18. The row decoder 10 may be a counter, a demultiplexer or any circuit or device capable of individually activating each sensor row 25. Although the row decoder 10 is shown separate from timing controller 20, a single device or circuit may be employed to perform the functions of these two components in accordance with the present invention.

Each active pixel sensor 35 in the array 5 may consist of a photosite and one or more on-chip transistors located within each sensor 35 to provide both gain and buffering functions. Active pixel sensor, as used herein, refers to devices commonly known in the art as active pixel sensors, as well as any other device or sensor configuration which collects and stores electrical charge in proportion to detected light intensity, and which buffers such stored electrical charge. A general description of exemplary active pixel sensors 35, including those having double-polysilicon structures, is provided in, for example, Fossum, E. R. "Active Pixel Sensors: Are CCD's Dinosaurs?", Proceeding of SPIE: Charge-Coupled Devices and Solid State Optical Sensors III, Vol. 1900, pp. 2–14 (1993), ("Fossum reference"), which is hereby incorporated by reference.

A schematic representation of an exemplary active pixel sensor 35 and a corresponding differential output circuit 18 in accordance with the present invention is shown in FIG. 2. Referring to FIG. 2, the active pixel sensor 35 is connected to the differential output circuit 18 by the corresponding column output line 65. Since other active pixel sensors 35 are also connected to the column output line 65, the line 65 has been shown broken by ellipses 67 in FIG. 2 for clarity. The other active pixel sensors 35 may preferably operate in a substantially identical manner to the active pixel sensor 35 shown in FIG. 2. Only one of the differential output circuits 18 has been shown in FIG. 2 for ease of illustration. The other differential output circuits 18 will preferably operate in a substantially identical manner to the circuit 18 illustrated in FIG. 2.

In FIG. 2, the active pixel sensor 35 may be represented as a photogate 100 charge-coupled to a transfer gate 105 which is further charge-coupled to a diffusion well 110. The gates 100 and 105 have gate electrodes 101 and 107, respectively. The photogate electrode 101 is connected to the photogate control line 180. The transfer gate electrode 107 may be connected to a suitable fixed voltage to enable the transfer of electrical charge from the photogate 100 to the diffusion well 110 as is described below. Electrons 102 beneath the photogate 100, electron transfer arrow 106, and transferred electrons 111 in the diffusion well 110 are an electron well representation known in the art to illustrate the transfer of electrical charge from the photogate 100, through the transfer gate 105, to the diffusion well 110.

The active pixel sensor 35 further includes a reset transistor 120, a voltage-follower transistor 125, a select transistor 130 and a load, such as a suitably biased load transistor 135. A diffusion node 115 connects the diffusion well 110 to the reset transistor 120 and the voltage-follower transistor 125. The reset and voltage-follower transistors 120, 125 are further connected to a fixed voltage VDD, which will preferably may be five volts if the active pixel sensor 35 is implemented as a CMOS device. The reset transistor 120 is also connected to the reset control line 184 of the control lines 55 that extends from the row decoder 10 shown in FIG. 1. An output 126 of the voltage-follower transistor 125 is further connected to the select transistor 130 which is connected to the load transistor 135.

The load transistor 135 is also connected to a fixed load voltage VLOAD and a fixed voltage VSS. The fixed voltage VSS will preferably be zero volts if the active pixel sensor 35 is implemented as a CMOS device. The select transistor 130 is further connected to the select control line 186 of the control lines 55 shown in FIG. 1. The load voltage VLOAD should be adjusted such that a desired resistance value is achieved across the load transistor 135 between the column output line 65 and the fixed voltage VSS. The desired resistance value should enable the transistor 125 to operate in a voltage follower mode when the select transistor 130 operates in saturation to effectively act as a closed switch between the transistors 125 and 135. Suitable alternatives for the load transistor 135 include on-chip or surface mount resistors, or any other passive or active devices which can provide the required electrical resistance when disposed between the column output line 65 and the fixed voltage VSS.

The active pixel sensor output 50, shown in FIG. 1, is schematically represented in FIG. 2 by a like numbered connection node between the select transistor 130 and load transistor 135 for clarity. The column output line 65 connects the sensor output 50 to the corresponding differential output circuit 18. Within the differential output circuit 18, the sensor output signal is provided to first and second single-pole single-throw switches 140, 145 which may be, for example, transistor switches or solid state relays.

The switches 140, 145 may individually be operated in open or closed positions. In the closed positions, the switches 140, 145 provide a sensor output signal to corresponding first and second charge storage devices, such as capacitors 150 and 155. The capacitors 150 and 155 are connected to the fixed voltage VSS as well as respective inputs 161 and 162 of a subtractive signal combiner, such as a differential amplifier 160. The switches 140 and 145 are controlled by control signals S1 and S2 generated by the timing control circuit 20.

An output 163 of the differential amplifier 160 generates the difference output signal which is provided to a third single-pole single-throw switch 170. The switch 170 is further connected to the imaging system output line 15. The switch 170 operates in an open or closed position, as controlled by a switch control signal S3 generated by the timing controller 20. When closed, the switch 170 provides the difference output signal to the common output line 15.

In operation, the row decoder 10 generates a suitable photogate control signal on a photogate control line 180 to cause the photogates 100 of each sensor 35 in the corresponding row to collect electrical charge based on the detected light intensities. The photogate 100 is permitted to collect electrical charge over an integration period, which may be a substantial portion of the frame interval. For instance, if the frame interval is 33 msec., corresponding to 30 frames per second, the integration period may be 33 msec. less approximately one microsecond if the sensor 35 is implemented as a CMOS device.

Upon completion of the integration period, the row decoder 10 may cause the biased transfer gate 105 to transfer the collected electrical charge from the photogate 100 to the diffusion well 110 by generating a suitable pulse in the photogate control signal. This method of transferring charge is well known in the art and is described in, for example, the above cited Fossum reference. A suitable duration for a photogate control signal pulse to cause the transfer gate 105 to transfer the collected electrical charge may be, for example, on the order of one microsecond. Further, the fixed transfer gate biasing voltage may be on the order of 2.5 volts if the sensor 35 is implemented as a CMOS device.

Another well known technique for transferring charge within an active pixel sensor is to clock or pulse the transfer gate electrode when the transfer is required. Both the biasing and clocking techniques cause the voltage potential beneath the transfer gates 105 to be greater than that beneath the photogate 100. Since electrical charge moves from regions of lower potential to regions of higher potential, then the collected charge in the photogate 100 moves to the transfer gate 105 and then to the diffusion well 110.

In active pixel sensors 35, the electrical charge maintained in the diffusion well 110 is buffered by the transistors 125 and 130 from signals generated over the corresponding column output line 65 by the other sensors 35 in the column 30. The transfer gate 105 further acts to buffer the electrical charge maintained in the diffusion well 110 from that collected by the photogate 100 at all times except when electrical charge is transferred from the photogate 100 to the diffusion well 110. The present invention relies on the buffered diffusion nodes 110 to maintain an electrical charge for a previous frame's detected light intensity during the times when the sensor 35 is not generating a voltage output signal and when the photogate 100 of the sensor 35 is collecting electrical charge for a present frame.

As a consequence, the present invention may use only two charge storage devices 150, 155 and a subtractive signal combiner 160 per sensor column 30 to generate the differential output signal DIFF. Conversely, typical prior art imaging systems required an analog-to-digital converter and an external memory for each light intensity detector in an array to generate such a differential output signal. Therefore, the present invention achieves a substantial advantage of having reduced system complexity, power consumption and size over such prior art imaging systems.

Each active pixel sensor 35 of the array operates in two different periods during a frame time interval. The two periods include a light detection period corresponding to the integration period, and a read out period. For a given detected frame interval, each sensor row 25 is sequentially activated to detect light during a light detection period and then selected to generate corresponding output signals during the read out period. The light detection period and read out period may overlap as is described in detail below with regard to FIG. 3.

For example, if a frame interval of 33 msec. is desired, the light detection period may consist of a substantial portion of that interval, and the read out period may be on the order of 10 μsec. after the light detection period. The row decoder 10 may overlap the light detection periods for adjacent sensor rows 25 to achieve the desired frame rate during the read out period. Such an overlapping technique is well known in the imaging system art.

Figure 3:
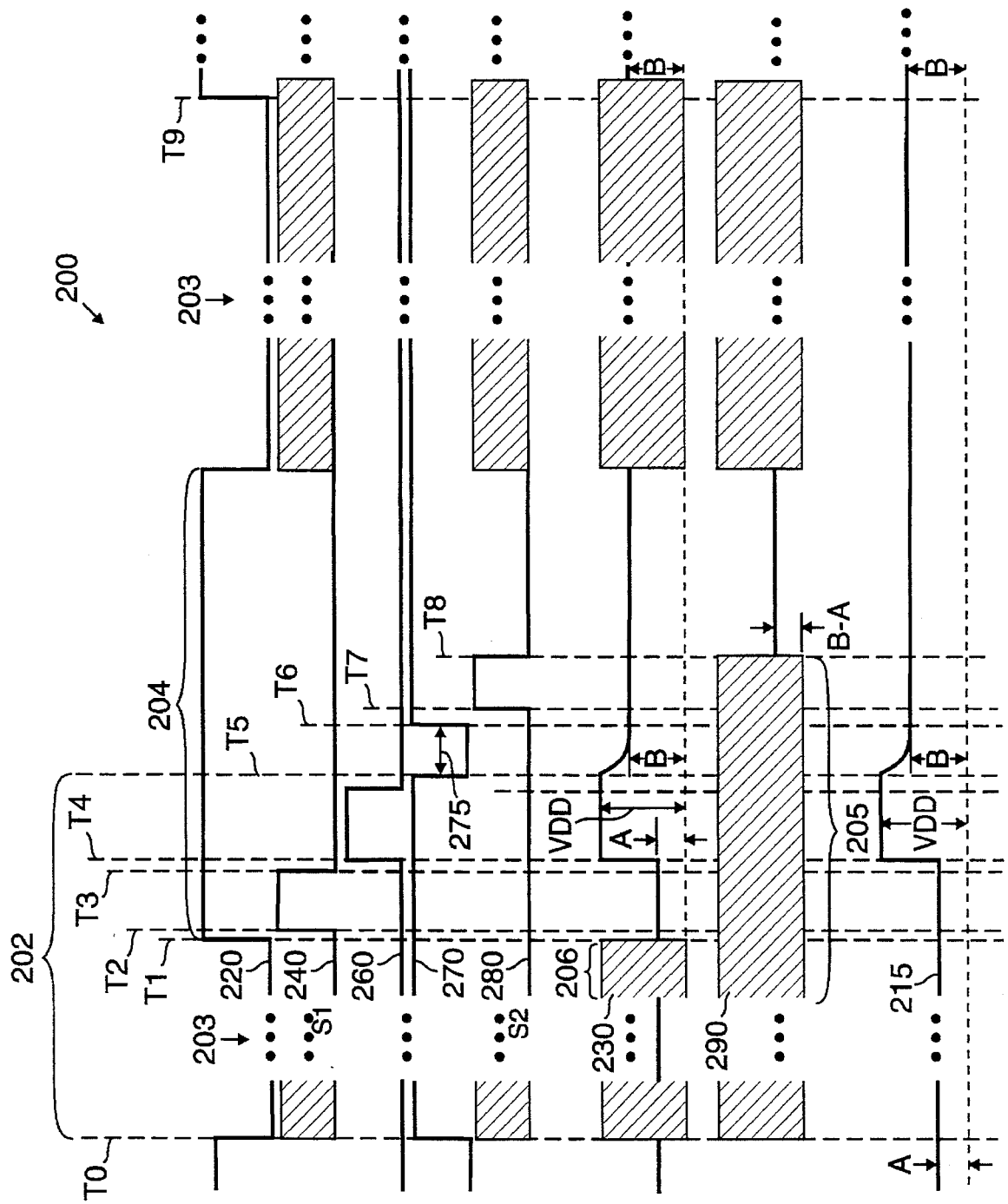
FIG. 3 is a timing diagram illustrating exemplary operation of the circuit of FIG. 2.

FIG. 3 shows a timing diagram illustrating one suitable operation of the sensor 35 and output circuit 18 of FIG. 2 in accordance with the present invention. In FIG. 3, details of waveforms 200 for an overlapping light detection period 202 and read out period 204 of the sensor 35 are shown for a present frame interval. Since the light integration period 202 is much longer than the read out period 204, the waveforms 200 have been shown by ellipses 203 during the light detection period for clarity. "Don't care" regions of the waveforms 200 are illustrated by cross-hatched bars such as region 205 of the waveform 290.

During the light detection period 202 between times T0 and T5, the row decoder 10, shown in FIG. 1, provides the photogate control signal, illustrated by waveform 270, in a high voltage state to the photogate electrode 101. The photogate control signal in the high voltage state causes the sensor photogate 100 to collect electrical charge based on the light intensity focused on that sensor 35 for the present frame. During the light detection period 202 between times T0 and T5, the photogate control signal 270 in the high voltage state further prevents the transfer gate 105 from transferring collected electrical charge to the diffusion well 110.

As a consequence, the electrical charge maintained in the diffusion well 110 is buffered from the photogate 100 during the present frame's light detection period 202 and thus corresponds to the previous frame's detected light intensity. Since the voltage potential at the diffusion node 115, illustrated as waveform 215, corresponds to the electrical charge maintained by the diffusion well 110, it, likewise, corresponds to the previous frame's detected light intensity during the light detection period 202. The diffusion node voltage potential 215 corresponding to the previous frame's detected light intensity during this period 202 is represented by a voltage magnitude A in FIG. 3.

At a time substantially near the end of the light detection period 202, such as at time T1, the row decoder 10 initiates the read out period by generating the select control signal, illustrated as waveform 220, in a high voltage state. The select control signal 220 remains in a high voltage state for the duration of the read out period 204 and is in a low voltage state at all other times. The high voltage state select control signal 220 causes the select transistor 130 in FIG. 2, normally in an "off" state, to operate in saturation or in an "on" state.

When operated in the on state, the select transistor 130 acts effectively as a closed switch which enables the transistor 125 to operate as a voltage-follower. While the transistor 125 operates as a voltage follower it generates a voltage at its output 126 and a voltage signal at the sensor output 50 that corresponds to the voltage potential 215 at the diffusion node 115. Since the diffusion node voltage potential 215 is a voltage of amplitudes A at time T1, the output voltage signal 230 illustrated as waveform 230, may also be considered an amplitude of A volts at time T1. Prior to time T1, the select transistor is in the "off" state and no output voltage signal is generated, as indicated by the "don't care" region 206. Further, since the diffusion node voltage potential 215 at time T1 corresponds to the previous frame's detected light intensity, the output signal 230 generated immediately after the time T1 also corresponds to the previous frame's detected light intensity.

A short time after the select signal is generated, such as at time T2, the timing controller 20 generates a switch control signal S1, illustrated as waveform 240, in a high voltage state to close switch 140. The closing of switch 140 permits the sensor output voltage signal 230 to charge the capacitor 150. After the capacitor 150 has had sufficient time to charge, such as at time T3, the switch control signal S1 240 is generated in a low voltage state causing the switch 140 to open. The time duration between times T2 and T3 should be selected to permit the capacitor 150 to sufficiently charge to a voltage potential corresponding to the received sensor output voltage signal 230 having the voltage A. A suitable charging time for the capacitor 150 is on the order of one microsecond. At time T3, the charge stored in the capacitor 150 corresponds to the amount of detected light by the sensor 35 for the previous frame.

After the voltage A has been stored in the first capacitor 150, such as at time T4, the row decoder 10 generates the reset signal pulse on the reset control line 55 in a high voltage state, as shown by waveform 260. This reset signal pulse 260 causes the reset transistor 120 to operate in the on state which forces the diffusion node 115 to the voltage VDD. As a consequence, the corresponding sensor output signal 230, likewise, increases to a voltage corresponding to the voltage VDD.

As FIG. 3 indicates, the light detection and read out periods 202, 204 overlap between times T1 and T5. Shortly after the reset pulse has concluded, such as at time T5, the light detection period 202 ends and a low voltage pulse 275 is generated for the photogate control signal 270. The low voltage pulse 275, between times T5 and T6, causes the collected electrical charge in the photogate 100 to transfer to the diffusion well 110 in a manner described above with regard to FIG. 2.

This transfer of electrical charge causes the diffusion node voltage 215 and the corresponding output voltage signal 230 to lower in proportion to the amount of collected charge or the detected light intensity for the present frame. The greater the light intensity, the greater the amount of collected charge and the greater the amount that the corresponding diffusion node voltage 215 is lowered. Shortly after time T5, the output voltage signal 230 provided to the output circuit 18 corresponds to the detected light intensity for the present frame. The magnitude of the sensor output signal 230 shortly after time T5 is illustrated as a voltage B in FIG. 3.

After the electrical charge is transferred to the diffusion well 110, such as at time T7, the timing control device 20 closes the second switch 150 by generating the switch control signal S2 in a high voltage state as shown by the waveform 280. The closing of the switch 145 causes the second capacitor 155 to charge to approximately the sensor output voltage signal 230, or in other words, to a value proportional to the voltage B. At time T8, after the capacitor 155 had sufficient time to charge, the timing control unit 20 generates the signal S2 in a low voltage state to cause the switch 145 to open.

After time T8, the voltages across the capacitors 150 and 155 correspond to the voltages A and B, respectively. As a consequence, after time T8, the differential amplifier generates a difference output signal 290 that is a voltage corresponding to the difference between the voltages A and B. Prior to time T8, the waveform 290 consists of the "don't care" region 205. Since the voltages across the capacitors 150 and 155 represent the light intensity detected by the sensor 35 for the previous and present frames, the generated sensor difference signal represents the difference of the detected light intensity by the sensor 35 between the flames.

At the appropriate time, the timing controller 20 generates switch control signal S3 to close the switch 170 which provides the difference output signal to the imaging system output line 15. The switch 170 is only closed at a particular time and for the proper duration, in order to insert the sensor differential output signal into its proper sequence position within the imaging system differential output signal DIFF.

Each pixel sensor 35 in each array row 25 is preferably operated in the same manner as is described above with regard to FIG. 3 to generate a differential output signal for a frame of a detected image. Since the voltage potential present at the diffusion node 115 of each sensor 35 is buffered from the corresponding photogate 100 and column output line 65, it maintains a voltage potential based on an amount of detected light from frame to frame. As a consequence, the voltage potential at the diffusion node 115 remains a voltage corresponding to the voltage B until that sensor 35 again enters a read out period for the next detected frame, as shown at time T9 in FIG. 3. Accordingly, during read out of the sensor 35 for the next frame at time T9, the sensor output voltage signal 230, corresponding to the previous frame, is the voltage B.

The photogate 100 does not collect charge while the voltage signal applied to its gate electrode 101 is in a low voltage state, such as between times T5 and T6. Further, the light detection period for the next frame begins at the conclusion of the low voltage pulse 275 on the photogate control signal 270 at time T6. In this manner, the amount of time that each pixel sensor 35 is not detecting light for each frame is minimized. The next frame's light detection period ends at the next generation of a low voltage pulse for the photogate control signal 270 which occurs at the appropriate time some time after time T9. The timing controller 20 continuously repeats this operation with the proper timing to achieve the differential output signal DIFF having the desired frame rate.

Figure 4:
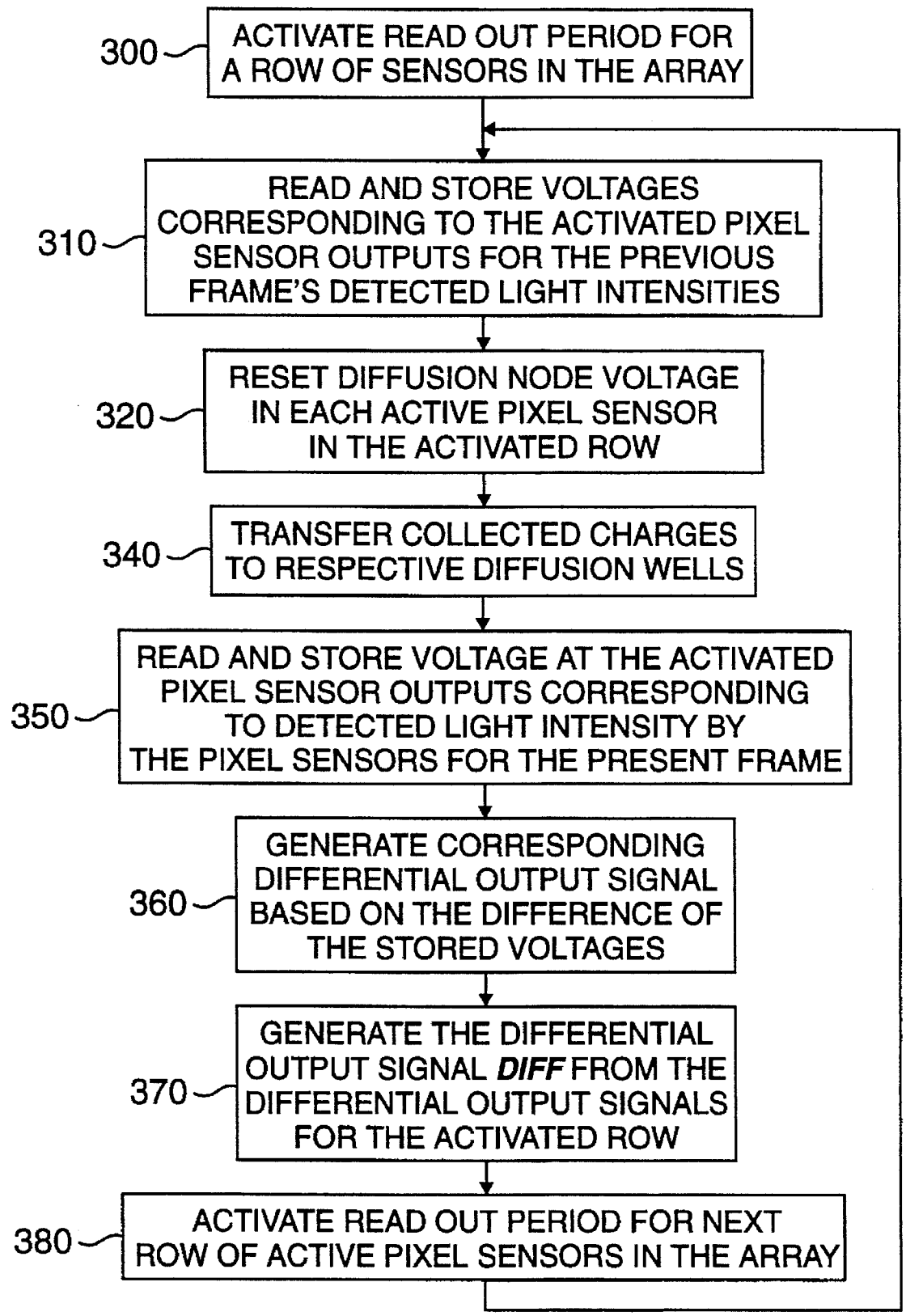
FIG. 4 is a flow diagram of an exemplary method for producing a differential output signal from an active pixel sensor array in accordance with the present invention.

FIG. 4 is a flow diagram summarizing an exemplary image detection method for generating the differential output signal DIFF in accordance with the present invention. Steps 300–380 of FIG. 4 are recited in terms of the events during the read out periods of each active pixel sensor 35. The generation of the corresponding photogate control signal 270 and corresponding light detection period are timed so as to enable the performance of steps 300–380 as indicated in FIG. 4.

Referring to FIG. 4, an active pixel sensor row 25 in the array 5 is first activated for read out by generating the appropriate select control signal on the corresponding select control line 186 in step 300. When activated for read out, each of the sensors 35 generates a voltage signal at its respective output 50 representing the voltage potential present at its diffusion node 115. Since the activated sensors 35 have not been reset, the diffusion node voltages and the corresponding output voltage signals at the sensor outputs 50 correspond to the light intensities detected by sensors 35 for the previous frame.

These sensor output voltage signals are then read and stored by the respective differential output circuits 18 in step 310. The step 310 corresponds to the closing of the first switch 140 and the resulting charging of the first capacitor 150 by the sensor output voltage signal, as described above with respect to FIGS. 2 and 3. After a voltage signal corresponding to the previous frame is read and stored, the diffusion nodes 115 of the activated sensors 35 are then reset to a reset voltage as indicated in step 320. Resetting of a diffusion node 115 may be accomplished with a high voltage pulse provided to the corresponding reset transistor 120 as described above with respect to FIGS. 2 and 3.

Then, in step 340, the electrical charges collected by the photogates 100 in the activated sensor row 25 are transferred to the respective diffusion wells 110. As stated above with respect FIGS. 2 and 3, transferring the collected electrical charges to the respective diffusion wells 110 causes the voltage of the diffusion nodes 115 to lower from their reset voltage. As a consequence, the voltages present at the activated sensors' diffusion nodes 115 and the corresponding output voltage signals provided to the differential output circuits 18 represent the detected light intensity for the present frame.

The voltage output signals for the present frame are then read and stored by the corresponding differential output circuits 18 in step 350. In accordance with the operation of the differential output circuit 18 of FIG. 2 as described above with respect to FIG. 3, the sensor output voltage signals are read and stored by charging the second charge storage devices 155. Upon reading and storing the voltage output signals for the present frame in step 350, the differential output circuits 18 maintain voltage potentials for the present and previous frames' detected light intensities.

Then, in step 360, a difference is taken of the stored voltages in each output circuit 18 to yield difference output signals. This step may be accomplished using the differential amplifier 160 of FIG. 2. The difference output signals correspond to the frame-to-frame difference in the amount of detected light intensity for each of the activated pixel sensors 35.

The difference output signals, such as those shown as waveform 290 in FIG. 3, are then sequentially provided to the imaging system output line 15, shown in FIG. 1, in a predetermined order in step 370 to form the differential output signal DIFF. As a consequence, the output signal DIFF is a serially transmitted compilation of the difference output signals for the sensors 35 of the activated row 25. The next sensor row 25 is then activated for read out by the appropriate corresponding select control line 60 in step 380.

Steps 310–370 are then repeated for the newly activated sensor row 25 to generate the respective difference output signals to form the corresponding portion of the differential output signal DIFF. In this manner, the image detection method of FIG. 4 continuously generates difference output signals for each sensor row 25 to produce the differential output signal DIFF for consecutive detected frames during the time that the imaging system is operational.

Although one embodiment of an active pixel sensor and array having differential mode has been described in detail above, it would be readily understood by those having ordinary skill in the art that many modifications to the described embodiment are possible without departing from the teaching of the present invention. All such modifications are intended to be encompassed by the claimed invention.

For instance, the differential output circuit 18 may use one single-throw double-pole switch instead of the two switches 140, 145, or may consist of any configuration of components capable of providing two serially received voltage signals to a signal combiner in a parallel fashion, and generating a difference signal based on the two voltage signals. Other active pixel sensor implementations with different voltages may be readily employed. In addition, although the array of FIG. 1 has been arranged into the activation of rows and the read out of columns, the present invention may connect any number of active pixel sensors at any array position to a corresponding differential output circuit.

We claim:

1. A method for generating a differential output video signal corresponding to an image focused on a sensor array having rows and columns of active pixel sensors, each sensor capable of collecting electrical charge based on a detected light intensity and having a diffusion well capable of holding an amount of electrical charge, each diffusion well being buffered from electrical signals generated external to the sensor, the method comprising the steps of:

sequentially activating each row of sensors for a period of time to achieve a desired detected frame interval;

detecting a first voltage potential at a diffusion node of each activated sensor, wherein each of the first voltage potentials correspond to collected charges held by the respective diffusion wells for the detected image at a corresponding immediate previous frame;

resetting the voltage potential of the respective diffusion nodes of the activated sensors to a predetermined voltage potential;

transferring electrical charges collected for a present frame's detected light intensity from the image by each activated sensor to corresponding diffusion wells with the respective sensors, the voltage potentials at the activated sensors' diffusion nodes changing from the predetermined voltage potential to second voltage potentials corresponding to the respective amounts of transferred electrical charges;

detecting the second voltage potentials at the diffusion nodes of the activated sensors; and generating an output signal based on sequentially determining the difference between the detected first and second voltage potentials of the activated sensors, wherein the sequential activation of each row of sensors generates an output signal of sequential segments of the detected differences in the image at the corresponding pixel sensors between the previous and present frames.

2. The method of claim 1, wherein the step of generating the output signal further comprises determining the difference between the detected first and second voltage potentials in the activated sensor row using respective differential output circuits connected to the active pixel sensors in each column.

3. The method of claim 1 further comprising the steps of:

storing the first voltage potential of each activated sensor in a respective one of a first plurality of charge-storage devices; and storing the second voltage potential of each activated sensor in a respective one of a second plurality of charge storage devices, wherein the step of generating the output signal includes applying the respective voltage potentials in each of the first and second pluralities of the charge storage devices to a like plurality of subtractive signal combiners that sequentially generate the corresponding portions of the differential output signal.

4. The method of claim 3, wherein the step of generating the output signal further comprises determining the difference between the detected first and second voltage potentials of a corresponding activated sensor by using respective differential output circuits containing the charge storage devices and subtractive signal combiner for each sensor in a corresponding column.

5. The method of claim 1, wherein the steps of detecting the voltage potentials at the diffusion nodes comprise the step of detecting corresponding outputs of voltage-follower transistors connected to the respective diffusion nodes.

6. The method of claim 1 further comprising the step of performing motion detection based on the generated output signal.

7. The method of claim 1 further comprising the step of performing data compression based on the generated output signal.

8. A method for generating a differential output video signal corresponding to an image focused on an active pixel sensor array, each sensor capable of collecting electrical charge for a detected light intensity and having a diffusion well capable of holding an amount of electrical charge, each diffusion well being buffered from electrical signals external to the sensor, the method comprising the steps of:

sequentially activating sensors in different portions of the array for a period of time to achieve a desired detected frame interval;

detecting a first voltage potential at a diffusion node of each activated sensor, wherein each of the first voltage potentials correspond to collected charges held by the respective diffusion wells for the detected image at a corresponding immediate previous frame;

resetting the voltage potential of the respective diffusion nodes of the activated sensors to a predetermined voltage potential;

transferring electrical charges collected for a present frame's detected light intensity from the image by each activated sensor to corresponding diffusion wells within the respective sensors, the voltage potentials at the activated sensors' diffusion nodes changing from the predetermined voltage potential to second voltage potentials corresponding to the respective amounts of transferred electrical charges;

detecting the second voltage potentials at the diffusion nodes of the activated sensors; and generating an output signal based on sequentially determining the difference between the detected first and second voltage potentials of the activated sensors, wherein the sequential activation of the sensors in each portion of the array generates an output signal of sequential segments of the detected differences in the image at the corresponding pixel sensors between the previous and present frames.

9. The method of claim 8, wherein the step of sequentially activating sensors in different portions of the array comprises activating the sensors in corresponding sensor rows.

10. The method of claim 8, wherein the step of generating the output signal further comprises determining the step of the difference between the detected first and second voltage potentials in the activated sensor row using respective differential output circuits connected to a respective active pixel sensor in each of the portions of the array.

11. The method of claim 8 further comprising the steps of:

storing the first voltage potential of each activated sensor in a respective one of a first plurality of charge-storage devices; and storing the second voltage potential of each activated sensor in a respective one of a second plurality of charge storage devices, wherein the step of generating the output signal includes applying the respective voltage potentials in each of the first and second pluralities of the charge storage devices to a like plurality of subtractive signal combiners that sequentially generate the corresponding portions of the differential output signal.

12. The method of claim 11, wherein the step of generating the output signal further comprises determining the difference between the detected first and second voltage potentials of a corresponding activated sensor by using respective differential output circuits containing the charge storage devices and subtractive signal combiner for each sensor in a corresponding portion of the array.

13. The method of claim 8, wherein the steps of detecting the voltage potentials at the diffusion nodes comprise the step of detecting corresponding outputs of voltage-follower transistors connected to the respective diffusion nodes.

14. The method of claim 8 further comprising the step of performing motion detection based on the generated output signal.

15. The method of claim 8 further comprising the step of performing data compression based on the generated output signal.

16. A method for generating a differential output signal from an active pixel sensor corresponding to the difference in the detected light intensity of an image over first and second integration time periods, the sensor having a diffusion well capable of holding an amount of electrical charge based on an amount of detected light intensity by the sensor, the diffusion well being buffered from electrical signals external to the sensor, the method comprising the steps of:

detecting a first voltage potential at a diffusion node of the active pixel sensor corresponding to a collected charge held in the diffusion well for the light intensity detected during the first integration period;

resetting the voltage potential of the diffusion node to a predetermined voltage potential;

transferring electrical charge collected for a present frame's detected light intensity from the image by the active pixel sensor to the diffusion well, the voltage potential at the diffusion node changing from the predetermined voltage potential to a second voltage based on the amount of transferred charge;

detecting the second voltage potential at the diffusion node; and generating an output signal based on the difference between the detected first and second voltage potentials taken at the diffusion node for the first and second integration period.

17. The method of claim 16 further comprising the steps of:

storing the first voltage potential in a first charge storage device after detecting the first voltage potential; and storing the second voltage potential in a second charge storage device after detecting the second voltage potential, wherein the step of generating the output signal includes the step of applying the voltage potentials stored in the charge storage devices to a subtractive signal combiner which generates the differential output signal.

18. The method of claim 16, wherein the steps of detecting the voltage potentials at the diffusion nodes comprises the step of detecting an output of a voltage-follower transistor connected to the diffusion node.

19. An imaging system for generating a differential output video signal based on an image focused on the imaging system, the imaging system comprising:

a plurality of active pixel sensors arranged into an array of rows and columns, each active pixel sensor being operable to generate a voltage at a diffusion node corresponding to detected light intensity by the sensor, each active pixel sensor being further operable to buffer the voltage potential present on the diffusion node from other signals generated external to the sensor;

a row decoder having a plurality of control lines connected to the sensor array, each control line being connected to the sensors in a respective column, wherein the row decoder is operable to activate the sensors in a row;

a plurality of differential output circuits, each differential circuit being connected to the respective sensors in a column, each differential circuit being operable to store first and second voltage signals received from the connected sensors and to selectively provide a difference sensor output signal to the common output line; and a timing controller connected to the row decoder and each differential output circuit, wherein the timing controller is operable to cause each sensor row to be sequentially activated, and to cause the activated sensors to provide a voltage signal corresponding to a previous detected frame to the output circuits and then to provide a voltage signal corresponding to a present detected frame to the output circuits, and wherein the timing controller is further operable to cause the differential output circuits to sequentially provide the difference output signal to the common output line to generate the imaging system differential output signal.

20. The system of claim 19, wherein the differential output circuit comprises:

first and second switches connected to the sensors;

first and second charge storage devices connected to respective first and second switches, wherein the switches are controlled by the timing controller to provide the first and second voltage potentials to the charge storage devices; and a subtractive signal combiner having first and second inputs and a differential output, the first and second inputs being connected to the first and second charge storage devices, wherein the charge storage devices store the voltage signals for the previous and present frames which are provided to the signal combiner which generates the difference output signal.

21. The system of claim 20, wherein the differential output circuit further comprises:

a third switch connected to the signal combiner output and the common output line, wherein the timing controller controls the third switch to close during the time the corresponding sensor differential output signal is to be provided to the output line.

22. The system of claim 20, wherein the charge storage devices are capacitors.

23. The system of claim 19, wherein the active pixel sensors employ a double-polysilicon structure.

24. The system of claim 19, wherein the timing controller and the row decoder are a single device.

25. An imaging system for generating a differential output video signal based on an image focused on the imaging system, the imaging system comprising:

a plurality of active pixel sensors arranged in an array, each active pixel sensor being operable to generate a voltage at a diffusion node corresponding to detected light intensity by the sensor, each active pixel sensor being further operable to buffer the voltage potential present on the diffusion node from other signals generated external to the sensor;

means for sequentially activating sensors in different portions of the array for a period of time to achieve a desired detected frame interval;

a plurality of differential output circuits, each differential output circuit being connected to the respective sensors in a corresponding portion of the array, each differential circuit being operable to store first and second voltage signals received from the connected sensors and to selectively provide a difference sensor output signal to a system output; and a timing controller connected to the activating means and each differential output circuit, wherein the timing controller is operable to cause the sensors in each array portion to be sequentially activated, and to cause the activated sensors to provide a voltage signal corresponding to a previous detected frame to the differential output circuits and then to provide a voltage signal corresponding to a present detected frame to the differential output circuits, and wherein the timing controller is further operable to cause the differential output circuits to sequentially provide the difference sensor output signal to the system output to generate the imaging system differential output signal.

26. The system of claim 25, wherein the array sensors are arranged into rows and columns.

27. The system of claim 26, wherein the activating means is a row decoder.

28. The system of claim 25, wherein each of the differential output circuits comprises:

first and second switches connected to the sensors of the corresponding array portion;

first and second charge storage devices connected to first and second switches, respectively, wherein the switches are controlled by the timing controller to provide the first and second voltage potentials to the first and second charge storage devices for storing; and a subtractive signal combiner having first and second inputs and a differential output, the first and second inputs being connected to the first and second charge storage devices, respectively, wherein the charge storage devices store the voltage signals for the previous and present frames which are provided to the signal combiner for generation of the difference output signal.

29. The system of claim 28, wherein each of the differential output circuits further comprises a third switch connected to the signal combiner output and the system output, wherein the system output is a common output line, and wherein the timing controller controls the third switch to close during the time the corresponding sensor differential output signal is to be provided to the output line.

30. The system of claim 25, wherein the active pixel sensors employ a doublepolysilicon structure.

31. The system of claim 25, wherein the timing controller and the activating means are a single device.

32. An active pixel sensor arrangement having a difference output signal comprising:

an active pixel sensor being operable to generate a voltage at a diffusion node corresponding to detected light intensity by the sensor, the active pixel sensor being further operable to buffer the voltage potential present on the diffusion node from other signals generated external to the sensor;

means for activating the sensor for a period of time to achieve a desired detected frame interval;

a differential output circuit connected to the sensor and being operable to store first and second voltage signals received from the connected sensor and to generate the difference sensor output signal based on the stored voltage signals; and a timing controller connected to the sensor and the differential output circuit, wherein the timing controller is operable to cause the sensor to provide a voltage signal corresponding to a previous detected frame to the output circuit and then to provide a voltage signal corresponding to a present detected frame to the differential output circuit, and wherein the timing controller is further operable to cause the differential output circuit to generate the difference output signal.

33. The sensor arrangement of claim 32, wherein the differential output circuit comprises:

first and second switches connected to the sensor;

first and second charge storage devices connected to first and second switches, respectively, wherein the switches are controlled by the timing controller to provide the first and second voltage potentials to the charge storage devices for storing; and a subtractive signal combiner having first and second inputs and a differential output, the first and second inputs being connected to the first and second charge storage devices, respectively, wherein the charge storage devices store the voltage signals for the previous and present frames which are provided to the signal combiner for generation of the difference output signal.

34. The sensor arrangement of claim 32, wherein the active pixel sensor employs a double-polysilicon structure.

35. The sensor arrangement of claim 32, wherein the timing controller and the activating means are a single device.

* * * * *

UNITED STATES PATENT AND TRADEMARK OFFICE
CERTIFICATE OF CORRECTION

| | | Page 1 of 1 |
|---|---|---|
| PATENT NO. | : 5,631,704 | |
| APPLICATION NO. | : 08/323203 | |
| DATED | : May 20, 1997 | |
| INVENTOR(S) | : Dickinson et al. | |

It is certified that error appears in the above-identified patent and that said Letters Patent is hereby corrected as shown below:

On the Title Pg, remove the asterisk to the left of the issue date.

Also on the cover sheet, in the left column, remove

Item [*] Notice: The term of this patent shall not extend beyond the expiration date of Pat. No. 4,966,963.

Signed and Sealed this
Sixth Day of March, 2012

David J. Kappos
*Director of the United States Patent and Trademark Office*